US008794595B2

(12) United States Patent
Reed et al.

(10) Patent No.: US 8,794,595 B2
(45) Date of Patent: Aug. 5, 2014

(54) DIAPHRAGM VALVE WITH IMPROVED SEALING PERFORMANCE AND LEAK DETECTION

(75) Inventors: Daniel I. Reed, Flemington, NJ (US); Joseph T. Sullivan, Grottoes, VA (US); Gerald C. Shifflett, Elkton, VA (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 244 days.

(21) Appl. No.: 13/386,938

(22) PCT Filed: Jul. 25, 2010

(86) PCT No.: PCT/US2010/043177
§ 371 (c)(1),
(2), (4) Date: Jan. 25, 2012

(65) Prior Publication Data
US 2012/0119130 A1    May 17, 2012

Related U.S. Application Data

(60) Provisional application No. 61/228,701, filed on Jul. 27, 2009.

(51) Int. Cl.
*F16K 1/00*    (2006.01)
(52) U.S. Cl.
USPC .......... 251/331; 137/552; 251/335.2; 251/358
(58) Field of Classification Search
USPC ................ 137/552, 558; 251/331, 358, 335.2
See application file for complete search history.

(56) References Cited

U.S. PATENT DOCUMENTS

| | | | | | |
|---|---|---|---|---|---|
| 713,294 | A | * | 11/1902 | Ernst ............................. | 251/318 |
| 1,128,327 | A | * | 2/1915 | Keith ............................. | 73/715 |
| 2,725,211 | A | * | 11/1955 | Boteler ........................... | 251/77 |
| 2,918,089 | A | * | 12/1959 | McFarland, Jr. ............... | 251/331 |
| 2,947,325 | A | * | 8/1960 | McFarland, Jr. ............... | 251/331 |
| 3,613,518 | A | | 10/1971 | Prosser | |
| 4,337,820 | A | | 7/1982 | Pierce | |
| 4,421,295 | A | | 12/1983 | Parkison | |
| 4,901,751 | A | * | 2/1990 | Story et al. ..................... | 137/312 |
| 4,960,038 | A | | 10/1990 | Chiba et al. | |
| 5,074,757 | A | | 12/1991 | Horn | |
| 5,106,269 | A | | 4/1992 | Castel | |
| 6,006,728 | A | * | 12/1999 | Matsuda et al. ............... | 123/472 |
| 6,074,178 | A | | 6/2000 | Bishop et al. | |
| 6,508,266 | B2 | | 1/2003 | Iritani et al. | |
| 6,994,320 | B2 | | 2/2006 | Johnson et al. | |
| 7,063,304 | B2 | * | 6/2006 | Leys ............................. | 251/331 |
| 7,218,237 | B2 | * | 5/2007 | Kates ............................. | 340/605 |
| 7,416,165 | B2 | * | 8/2008 | Ohmi et al. ..................... | 251/331 |
| 8,104,740 | B2 | * | 1/2012 | Igarashi ......................... | 251/61.2 |
| 2010/0294970 | A1 | * | 11/2010 | Re ................................ | 251/322 |
| 2012/0193564 | A1 | * | 8/2012 | Takeuchi et al. ............... | 251/331 |

* cited by examiner

*Primary Examiner* — Eric Keasel
*Assistant Examiner* — R. K. Arundale
(74) *Attorney, Agent, or Firm* — Law Offices of Grady L. White, LLC

(57) ABSTRACT

Diaphragm valve with internal leak detection and improved external leak sealing performance. In diaphragm valves comprising diaphragms that have shields and backings, a rigid seal plate interposed between the shield and backing prevents peripheral regions of the shield from cold-flowing into the backing, despite the compression forces produced by tightening the fasteners that secure the diaphragm to the valve's bonnet assembly and body. An access port passing through the seal plate provides an interface between a void located between the shield and the backing and a breach detector. The breach detector is configured to detect pressure, volume, moisture or mass deviations in fluid disposed in the void, and the deviations indicate whether there's a rupture in the shield or the backing. The breach detector can be connected to an alarming device or signaling system to provide warnings and alerts to valve operators, process control panels or data communication networks.

30 Claims, 13 Drawing Sheets

UNTORQUED

TORQUED

DIAPHRAGM VALVE WITH IMPROVED SEALING PERFORMANCE AND LEAK DETECTION

TECHNICAL FIELD

Embodiments of the present invention relate generally to two-piece diaphragm valves commonly used as flow control or shut-off valves in a variety of processing applications and industries, including without limitation, food and beverage, pharmaceutical and biotech. More particularly, the present invention relates to methods and devices for preventing and detecting leaks, ruptures or other failures of the diaphragm in such two-piece diaphragm valves.

RELATED ART

Diaphragm valves (or membrane valves) are typically used to start, stop and/or control the flow of process fluids (e.g., gases, liquids or slurries) through a processing system, or to create or control vacuum spaces in the processing system. In general, a diaphragm valve comprises a valve body having an internal flow pathway between two or more ports, a flexible diaphragm, a compressor that pushes and stretches the flexible diaphragm across the internal flow pathway, and a "saddle" or "seat" upon which the flexible diaphragm closes to reduce or shut off the flow of the process fluid through the internal flow pathway. Diaphragm valves are typically constructed from metal, solid plastic, flexible plastic, rubber and glass, or some combination of metal, plastic, rubber and glass.

In some diaphragm valves, the flexible diaphragm component is constructed from at least two flexible pieces, including a backing (sometimes referred to as a backing cushion, or backer), and a protective membrane, called a "shield," that serves as a protective and/or sterile boundary between the operating components of the valve on the one hand, and the flow of the process fluid on the other. The shield prevents the process fluid from coming into contact with the operating components, such as the backing and the compressor. Isolating the operating components of the valve from the flow of process fluid makes the valve suitable for viscous, hazardous, abrasive or corrosive flows because the valve's sealing system avoids any contamination towards or from the environment. As such, two piece diaphragm valves are commonly used in situations where the process fluid might become contaminated by contact with an ordinary one-piece diaphragm, or where the process fluid is corrosive or hazardous, and thus might degrade parts of diaphragm valve or pose a risk to the external environment or process operators. Typically, the shield is made from a sanitized elastic polymer, such as polytetrafluoroethylene (PTFE).

In two-piece diaphragm valves, the two-piece flexible diaphragm is fixed between a bonnet assembly (which houses the compressor), and the valve body (which houses the internal fluid pathway). The bonnet assembly, valve body and two-piece flexible diaphragm are held together by fasteners (e.g., screws, bolts, pins, hooks or clamps). The backing in the two-piece flexible diaphragm provides a spring-like memory that serves to help protect the shield against abrasions, ruptures and tears that would otherwise result if the shield were in direct contact With the compressor during operation. A substantially enclosed cavity (or interstitial void) lies between the center regions of the backing and the shield.

There are at least two types of two-piece diaphragm valves. The first type is called a "weir" diaphragm valve and the second type is called a "straight-way" diaphragm valve. In a weir-type diaphragm valve, process fluid flows through an internal flow pathway over a generally vertical weir (or "saddle") in the valve body, the weir extending from the wall of the internal flow pathway opposite the diaphragm and disposed transverse to the flow path. The weir separates the upstream and downstream segments of the internal flow pathway. The two-piece flexible diaphragm is affixed to the valve body in a position spaced apart from and generally opposite from the top of the weir. To close the valve, a compressor and a valve stem assembly located above the two-piece flexible diaphragm are operated to press down upon the two-piece flexible diaphragm so as to force the center region of the flexible diaphragm down against the top of the weir, which restricts or prevents the flow of fluid between the upstream segment and the downstream segment of the internal flow pathway. Typically, a transverse seal bead is disposed on the underside of the center region of the shield on the flexible diaphragm so that the transverse seal bead mates with the top of the weir, thereby improving the effectiveness of the seal between the shield and the top of the weir.

Straightway diaphragm valves are configured and operate in substantially the same manner as weir diaphragm valves, except that in a straightway diaphragm valve, there is no weir in the process fluid passageway. Thus, in a straight-way diaphragm valve, the process fluid moves through the internal flow pathway without the interruption, interference or diversion of fluid that would otherwise be caused by a weir. The stem, compressor, two-piece flexible diaphragm, valve body and internal flow pathway are all arranged so that actuation of the compressor to close the valve causes the center region of the diaphragm to flex and travel entirely across the diameter of the internal flow pathway until the center region meets a "seat" in the opposite wall of the internal fluid pathway, thereby shutting off the flow of process fluid therethrough. Notably, embodiments of the present invention may be beneficially used in both weir-type and straightway-type two-piece diaphragm valves.

In some two-piece diaphragm valves, such as, for example, the ITT Pure-Flo™ and the Saunders™ weir-style diaphragm valves, the shield has around its outer perimeter a raised perimeter seal bead designed to press against the valve body when the fasteners are tightened in order to help prevent process fluid from leaking out of the internal flow pathway to the exterior areas of the valve.

A major drawback associated with conventional two-piece diaphragm valves is that, over time, the torque applied to the fasteners causes the perimeter regions of the shield and/or the perimeter seal bead on the perimeter region of the shield to back-flow into the backing cushion. Back-flow of the perimeter regions of the shield and the perimeter seal bead is undesirable and counter-productive to sealing, as it reduces the size and effectiveness of the seal and permits process fluid to leak out of the internal flow pathway by passing through the small spaces between the valve body and the shield and potentially harm the external parts of the valve or environment. This problem is exacerbated due to the tendency of diaphragm valve operators to over tighten the fasteners on the valve in order to try to reduce or prevent such external leaks. The over tightening increases the compression forces on the peripheral shield region of the shield and tends to increase, rather than reduce, the likelihood that the perimeter region of the shield and/or the perimeter seal bead on the perimeter region of the shield will rip, tear or back flow into the backing cushion, which leads to more external leakage.

In addition to the aforementioned external leakage problems, conventional two-piece diaphragm valve operators must also worry about internal leaks. An internal leak occurs when a diaphragm valve that is completely closed fails to completely shut off the flow of process fluid through the internal pathway of the valve body, or when process fluid passes through the shield and into spaces behind the shield where the process fluid was never meant to go. Internal leakage frequently occurs because the shield has been ripped, punctured, ruptured or otherwise suffered some other kind of physical compromise or failure, which permits process fluid to flow through the damaged area of the shield, and then pass into the void behind the shield and/or out of the exit port in the valve body, even though the valve is supposed to be closed. Rips, punctures or tears in the shield may also permit fluids (e.g., gases or liquids) located behind the shield and separated from the process fluid to pass through the shield and into the internal flow pathway to mix with process fluid, thereby potentially contaminating the process fluid, changing the pressure in the internal fluid pathway, or otherwise impairing or disrupting the operation of the processing system. Consequently, operators and manufacturers using conventional two-piece diaphragm valves must regularly and frequently inspect and replace the shields in two-piece diaphragm valves in order to avoid expensive and potentially disastrous consequences that might result if a shield fails. In processing applications utilizing conventional two-piece diaphragm valves, it is not unusual to inspect and/or replace the shields every week, and sometimes even more frequently.

The procedures necessary for inspecting and/or replacing the diaphragm components of conventional two-piece diaphragm valves is both expensive and time-consuming. Prior to the present invention, the only effective and reliable way to detect failure or potential failures in two piece diaphragms was to take the diaphragm valve out of service, disassemble it, and visually inspect the surfaces of the shield for ruptures, punctures or tears, which may not be easily detected with the human eye. Typically, this means temporarily shutting down the processing operation. Moreover, in cases where the shield must always remain sterile and uncontaminated by the external environment, disassembling the valve may require disposal or reprocessing of all of the valve components inspected, substantially increasing the time delays, operating and maintenance expenses for the processing operation, while substantially reducing production efficiency.

Several ideas have been proposed to try to address the problem of over tightened fasteners associated with conventional diaphragm valves. U.S. Pat. No. 6,047,953 to E. Jacob Jr., for example, is directed to a universal diaphragm made of elastomeric material having rigid solid compression restrainers incorporated within the diaphragm for preventing over compression of the diaphragm during assembly. U.S. Pat. No. 2,578,730, to G. Nicholson et al., describes a flexible pressure induced-self-sealing diaphragm that eliminates the use of a bolted connection with the peripheral edges of the diaphragm to instrument housing. U.S. Pat. No. 6,155,535, to J. P. Marcilese, discloses a diaphragm-sealed valve having stops, mechanical means placed between a top and bottom plate when the diaphragm-sealed valve is assembled.

But none of these proposals have addressed the aforementioned problems of external leakage due to the certain areas of the shield having back-flowed into the backing cushion, or detecting shield failures or potential failures without disassembling, re-sterilizing and/or replacing the valve components. Consequently, using conventional two-piece diaphragm valves in sensitive and sterile processing operations continues to be an expensive and time-consuming proposition due to the high incidence of external leaks caused by back-flowing of the shield into the backing, as well as the relatively frequent losses in time and productivity resulting from having to take the conventional two-piece diaphragm valves out of service to carry out the inspections required to detect and prevent shield failures.

SUMMARY OF THE INVENTION

As will be described in more detail below, embodiments and variations of the present invention address the above-described problems by providing a diaphragm valve with improved external leak sealing performance, as well as internal leak detection. The improved external leak sealing performance is achieved by introducing a rigid seal plate, which might also be called a "shim" or "spacer," between the shield and the backing, and which prevents the peripheral regions of the shield from flowing into the backing, despite the compression forces produced by tightening the fasteners. Internal leak detection is achieved by adding to the rigid seal plate one or more special channels, chambers or conduits, hereinafter referred to as "access ports," and one or more port connectors. The access ports and port connectors are adapted to fluidly connect a void located between the shield and the backing to a breach detector configured to detect pressure, volume, moisture and/or mass deviations for the fluid located within the void. Such deviations within the void, which may be detected by the breach detector without disassembling the valve, are indicative of additional fluid, which may comprise gas or liquid, passing into or out of the void, which indicates that there has been some kind of failure or compromise in the physical integrity of the shield, the backing, or both the shield and the backing. An alarming device or signaling system may be attached to the breach detector to provide warnings and alerts to valve operators, process control panels or data communications networks when a breach is detected.

In general, embodiments of the present invention provide a diaphragm valve, comprising a bonnet assembly, a valve body, a shield having a peripheral shield region, a backing having a peripheral backing region, a seal plate comprising an aperture circumscribed by a closed path, and one or more fasteners for securing the shield, the backing and the seal plate between the bonnet assembly and the valve body so that the closed path of the seal plate lies between the peripheral shield region of the shield and the peripheral backing region of the backing. The closed path of the seal plate, which may take the form of any number of different geometric shapes, including but not limited to a circle, ellipse, square, rectangle or triangle, for instance, prevents the peripheral shield region of the shield from back flowing into the peripheral backing region of the backing, despite compressive forces exerted on the peripheral shield region by operation of the one or more fasteners. If the peripheral shield region of the shield includes an optional raised perimeter seal bead, then the closed path of the seal plate also prevents the raised perimeter seal bead on the peripheral shield region from back-flowing into the peripheral backing region of the backing despite the compressive forces exerted on the perimeter seal bead by operation of the one or more fasteners.

Preferably, the closed path of the seal plate has a rigidity that is greater than the rigidity of the peripheral backing region of the backing. More preferably, the closed path of the seal plate has a rigidity that is greater than the rigidity of the peripheral shield region of the shield. Most preferably, the closed path of the seal plate has a rigidity that is greater than the rigidities of both the peripheral backing region of the backing and the peripheral shield region of the shield.

A substantially enclosed interstitial void, located between the shield and the backing, typically confines a volume of fluid (e.g., gas or liquid) during normal operation of the valve.

When there is a breach in the shield component of the valve, additional fluid passes into or out of the void, thereby causing a deviation in one or more properties (e.g., pressure, volume, moisture or mass) associated with the fluid confined by the void. An access port extending though the closed path of the seal plate fluidly couples the substantially enclosed interstitial void to a port connector located on an outward-facing surface of the closed path. The port connector is configured to provide an interface to an optional breach detector (such as a pressure sensor, pressure transmitter, volumetric flow sensor or moisture detector) that will detect the deviation (positive or negative) in the substantially enclosed interstitial void, which will indicate that the volume of fluid confined by the substantially enclosed interstitial void has changed (i.e., fluid is passing through or around the shield or the backing). In preferred embodiments, the sensitivity of the breach detector may be operator-adjusted according to the requirements of the particular situation, in order to avoid false positives by taking into account what may be considered "normal" fluctuations in the properties of the fluid located in the void during normal operation of the valve. Such "normal variations" may include, for instance, variations in pressure and volume due to actuation of the compressor or changes in the temperature of the fluid confined in the void.

An alarming system may be mechanically or electronically coupled to the pressure sensor, to provide a visual or audible alert responsive to the detection of a breach in the shield by the breach detector. The breach detector may also be electronically coupled to a data communications network, configured to distribute a signal or message responsive to the detection of the breach. In addition to a pressure sensor, the breach detector may comprise, for example, a pressure transducer, a volume sensor, a mechanical switch, a hydraulic switch, an electronic switch or a pneumatic switch.

In some embodiments, the closed path of the seal plate may include a plurality of access ports passing through the closed path to fluidly couple the substantially enclosed interstitial void to a single port connector located on an outer surface of the closed path. Alternately, the plurality of access ports passing through the closed path may serve to fluidly couple the substantially enclosed interstitial void to a respective plurality of port connectors located on one or more outward-facing surfaces of the close path.

The seal plate provides a rigid support surface to support the back side of the peripheral shield region of the shield. When the fasteners of the valve are tightened, the seal plate prevents the cold-flow movement of the peripheral shield region of the shield from cold-flowing back into the backing. By preventing the back-flowing of the peripheral shield region of the shield, the seal plate restricts movement of the perimeter seal bead so that it can only move towards the valve body, which improves sealing and helps to prevent process fluid from leaking out of the valve. Using the seal plate also enhances the valve's ability to maintain the required torque applied by tightening the fasteners, because the perimeter shield region of the shield cannot move backwards into the soft rubber (EPDM) backing cushion as the fasteners are tightened. Thus, incorporation of the seal plate into the diaphragm valve significantly improves the performance of the peripheral shield region. Valve reliability with regard to product leakage is enhanced without any adverse impact on valve operation or maintenance.

It is anticipated that the seal plate may be installed between the shield and the backing by the original manufacturer, or alternatively, provided as a component of an end-user-installable diaphragm valve replacement product provided by a valve manufacturer or refurbisher. The seal plate may be used, for example, on ITT Pure-Flo weir-style diaphragm valves (manual or automated), sizes ½" through 3", where a Teflon shield is used in conjunction with a rubber backing cushion (EPDM or other), and where the Teflon shield has a perimeter seal bead which provides the seal against the metal valve body for containment of product leakage. The seal plate may also be used with Saunders weir-style diaphragm valves, which have similar diaphragm configurations and sizes.

BRIEF DESCRIPTION OF THE DRAWINGS

Exemplary and therefore non-limiting embodiments and variations of the present invention, and various aspects, features and advantages thereof are explained in detail below with reference to and with the aid of the drawings, which constitute a part of this specification and include depictions of the exemplary embodiments. In these drawings:

FIGS. 8A and 8B show detailed cross-sectional views of some of the components of a conventional two-piece diaphragm valve (untorqued and torqued), while

DETAILED DESCRIPTION OF EXEMPLARY EMBODIMENTS

Non-limiting examples of devices and methods arranged and configured according to certain embodiments and variations of the present invention will now be described in some detail by reference to the figures.

Figure 1A:
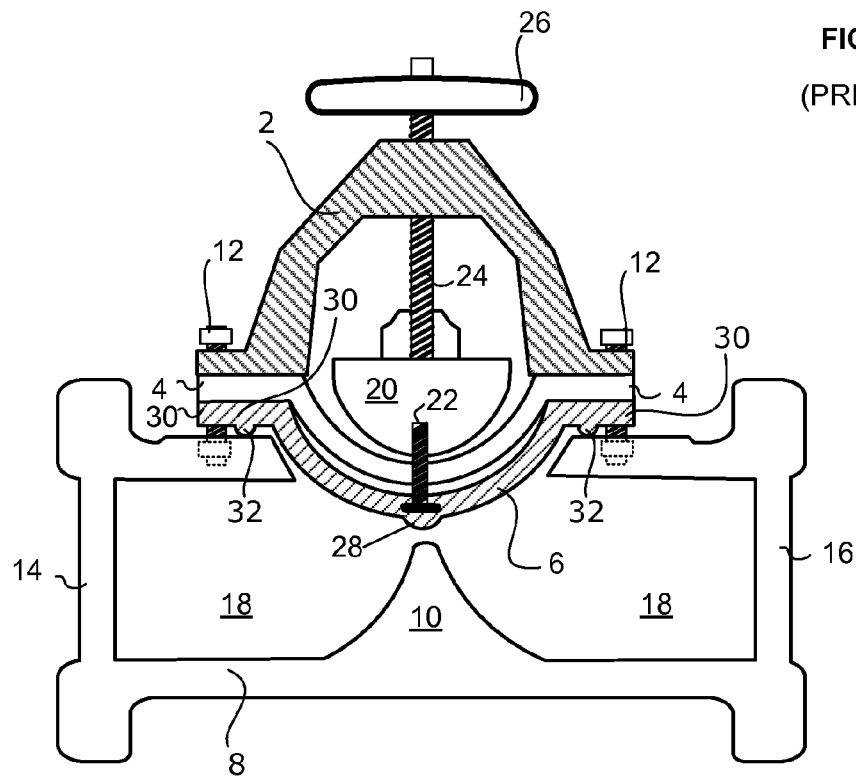
FIGS. 1A and 1B show, respectively, a cross-sectional view of a prior art weir-type diaphragm valve, and a cross-sectional view of the same prior art weir-type diaphragm valve with a shield that has back flowed into the backing and arrows indicating the leakage problems associated therewith.
Figure 1B:
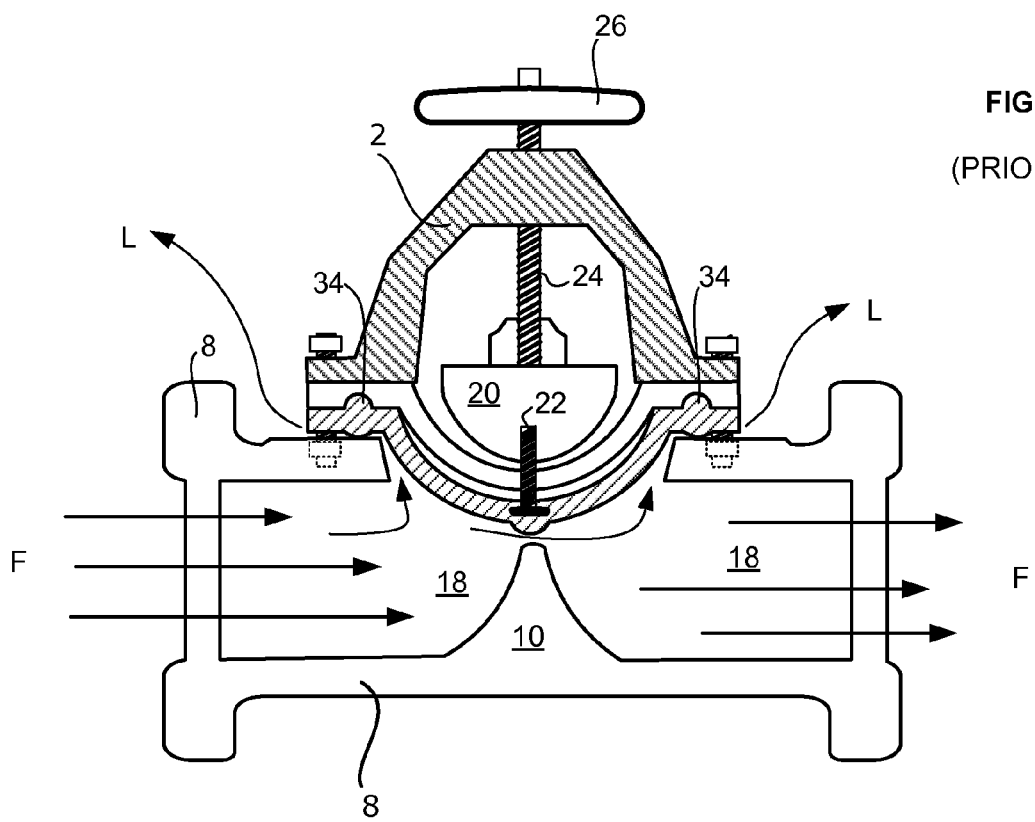

FIG. 1A contains a cross-sectional diagram illustrating the main components of a conventional weir-type diaphragm valve. FIG. 1B, which contains a second cross-sectional diagram of the same conventional weir-type diaphragm valve, illustrates the back flowing and leakage problems typically associated with conventional valves. (For simplicity and ease of comprehension, some of the reference numerals identifying some of the components in the diagram shown in FIG. 1A have been omitted from the diagram shown in FIG. 1B). Unless otherwise indicated, it should be understood that the following discussion applies equally to weir-type and straight-way valves.

Conventional weir-typed diaphragm valves typically include the basic parts shown in FIGS. 1A and 1B, although the relative sizes and materials of construction may vary according to the particular processing application and the particular fluid flowing through the valve. As shown in FIGS. 1A and 1B, the basic parts include a bonnet assembly 2, a backing 4, a shield 6, a valve body 8, a generally vertical weir 10 disposed transverse to an internal flow pathway 18 within the valve body 8, and fasteners 12 that secure backing 4 and shield 6 in position between the bonnet assembly 2 and the valve body 8, so that the central region of the shield 6 lies opposite from the weir 10. The valve body 8 has an inlet end 14 and an outlet end 16 that permits a process fluid F, whose flow is being controlled, to pass through the internal flow pathway 18.

The bonnet assembly 2 comprises a compressor 20 that is in communication with the shield 6 via a mechanical link 22. Typically, although not necessarily, the mechanical link 22 comprises a simple hook, screw or other metal or polymer connection mechanism, which may be attached at one end to the compressor 20 and at its other end to the shield 6, and arranged to move the shield 6 in equal proportion to the movement of the compressor 20. The bonnet assembly 2 further comprises a stem assembly 24, in communication with the compressor 20 and a handle 26, the stem assembly 24 being adapted for alternatively raising and lowering the compressor 20 and mechanical link 22 when handle 26 is turned. A transverse seal bead 28 runs across the central portion of the shield 6 opposite from the weir 10 of the valve body 8. Lowering compressor 20 and mechanical link 22 by turning handle 26 flexes the central region of the shield 6 toward weir 10 to restrict the flow of process fluid F through the internal flow pathway 18 of valve body 8. When the transverse seal bead 28 comes into contact with and is compressed against the weir 10, the flow of fluid F through internal flow pathway 18 will normally cease.

When the handle 26 operated to cause stem assembly 24 to raise the compressor 20, the shield 6 is pulled by mechanical link 22 away from the weir 10, thus permitting process fluid F to resume flowing through internal flow pathway 18 of valve body 8 by passing through the space between the bottom of the transverse seal bead 28 and the top of the weir 10. In the accompanying figures, backing 4 and shield 6 are shown as forming a convex area in the wall of the internal flow pathway 18 of the valve body 8 (i.e., bulging outward toward the weir 10). It should be understood, however, that when the valve is in the open position, and because they are flexible, the backing 4 and the shield 6 are more likely to form a concave area in the wall of the internal flow pathway 18 (i.e., bulging away from the weir 10), thereby permitting the process fluid F to flow up and over the apex of the weir 10, through the concave area and out of the outlet end 16 of the valve body 8 with minimal interference from the process fluid-facing surface of the shield 6.

Extending continuously around the perimeter of shield 6, there is a peripheral shield region 30. The peripheral shield region 30 has a raised perimeter seal bead 32 on the side of shield 6 lying adjacent to the valve body 8 and opposite from the side facing the backing 4. When the diaphragm valve is assembled, the backing 4 and the shield 6 are fixed between the bonnet assembly 2 and the valve body 8 so that the raised perimeter seal 32 on the peripheral shield region 30 is compressed against the valve body 8. When the fasteners 12 are tightened down, the raised perimeter seal bead 32 is compressed by the valve body 8, which is supposed to help prevent process fluid F from leaking into the surrounding environment by passing through the small spaces between the valve body 8 and the peripheral shield region 30 of shield 6.

Product leakage in the peripheral shield region 30 of the shield 6 has typically been controlled by the application of additional torque on the valve fasteners 12 as the first course of action. It has been discovered and observed, however, that operators, seeking to correct or prevent such leakage, frequently apply so much torque to the fasteners 12 that, over time, the raised perimeter seal bead 32 is so severely compressed by the valve body 8 that the raised perimeter seal bead 32 is flattened and forced to flow back upon itself, thereby causing a portion of the shield 6 that is immediately adjacent to the compressed and flattened perimeter seal bead 32 to move in the same direction. Since the backing 4 used in conventional valves is typically constructed from some type of rubber or other polymer, such as ethylene propylene diene monomer (EPDM), there is relatively little resistance to prevent the raised perimeter seal bead 32 from flowing back upon itself and displacing the opposite side of the shield 6. In some cases, and as illustrated in FIG. 1B, for example, the back flowing of the raised perimeter seal bead 32 and the concomitant displacement of the opposite side of the shield 6 creates on the side of shield 6 facing the backing 4 a bulge 34 that actually penetrates the surface of the backing 4. Back flowing of the raised perimeter seal bead 32 and penetration of the backing 4 by the bulges 34 is undesirable and counter-productive to sealing, as it reduces the size and severely undermines the effectiveness of the raised perimeter seal bead 32 compressed against the valve body 8, and typically leads to process fluid F being permitted to escape the valve and leak into the surrounding environment. The escaping process fluid is indicated in FIG. 1B by the arrows L.

Figure 2:
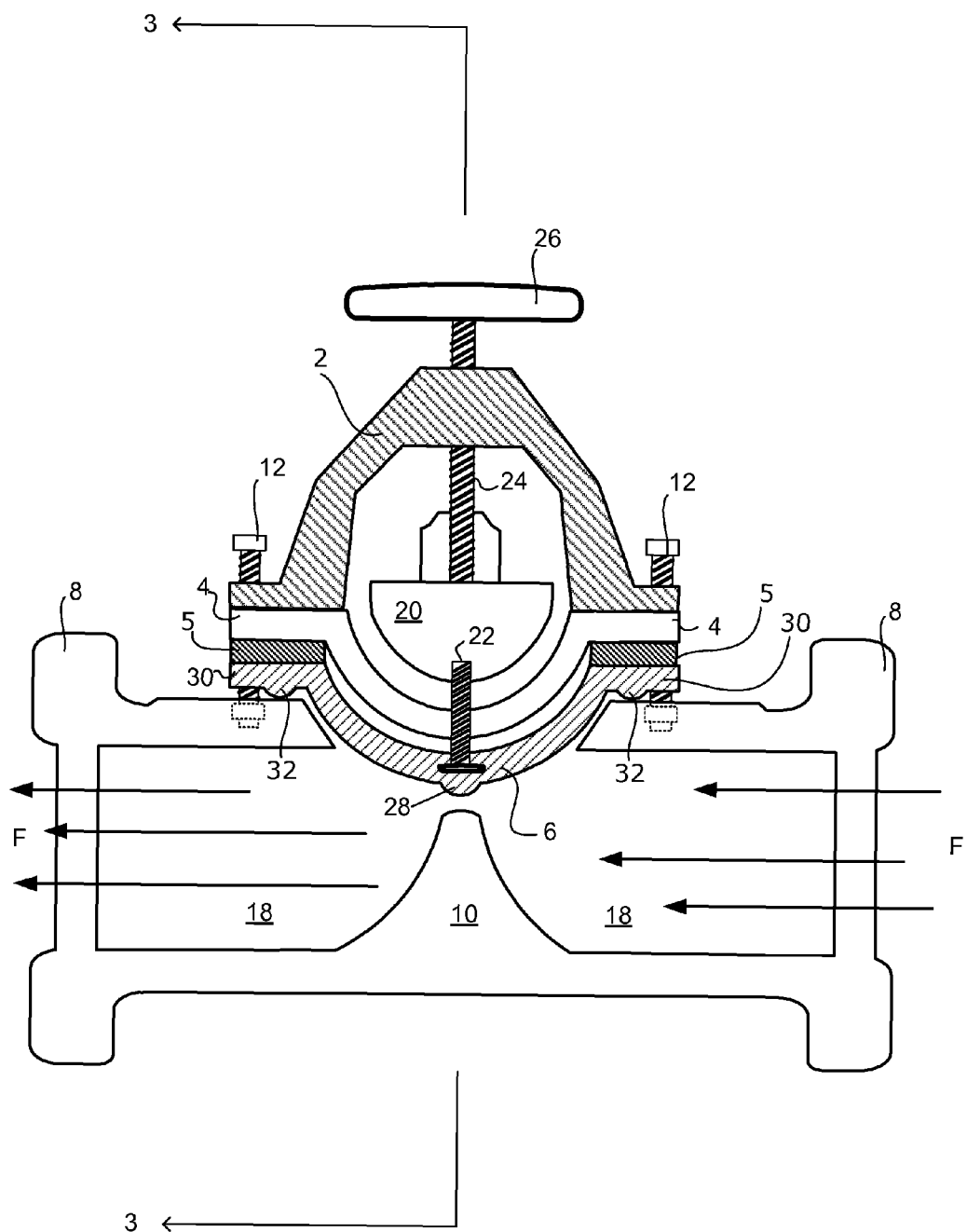
FIGS. 2 and 3 show cross-sectional views of an exemplary diaphragm valve constructed according to one embodiment of the present invention, with the seal plate, shield and backing secured between the bonnet assembly and valve body with fasteners.
Figure 3:
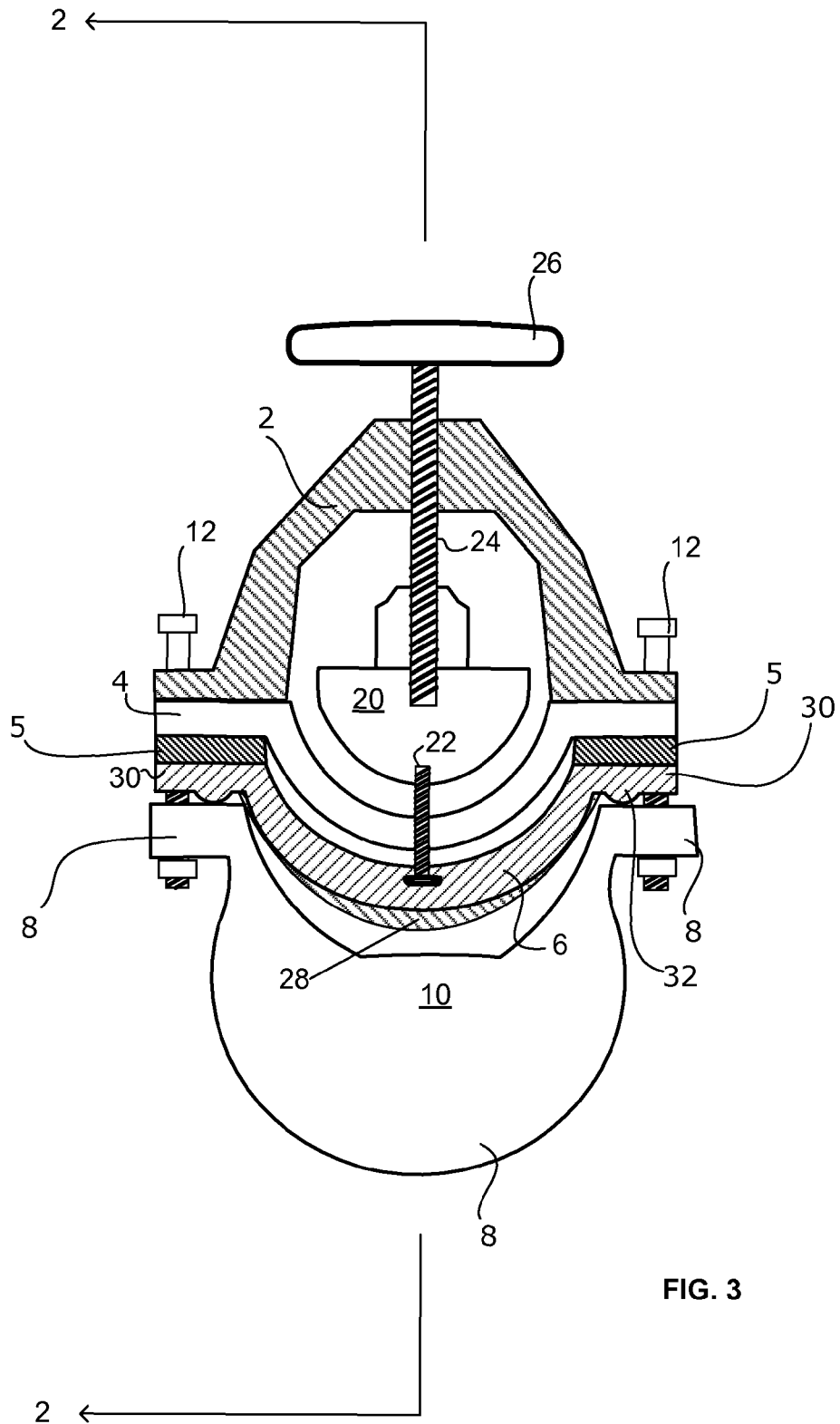

FIGS. 2 and 3 show cross-sectional diagrams of a diaphragm valve constructed according to one embodiment of the present invention. The cross-sectional diagram in FIG. 2 shows the diaphragm valve as viewed from the side, i.e., along a line perpendicular to the direction of flow of the process fluid F through the internal flow pathway 18, while FIG. 3 shows the diaphragm valve as viewed from one end, i.e., along a line parallel to the direction of flow of the process fluid F through internal flow pathway 18.

As illustrated by the diagrams shown in FIGS. 2 and 3, embodiments of the present invention provide a seal plate 5 that is inserted between the backing 4 and the shield 6. The seal plate 5 prevents the peripheral shield region 30 of the shield, or more particularly, the raised perimeter seal bead 32 on the peripheral shield region 30 of the shield 6, from backflowing or otherwise moving into the backing 4 when the fasteners 12 are tightened. By preventing the back-flow, the seal plate 5 confines the potential displacement of the peripheral shield region 30 and the raised perimeter seal bead 32, if any, towards the valve body 8 when torque is applied to the fasteners 12. Because the peripheral shield region 30 and/or the raised perimeter seal bead 32 cannot move backwards into the soft backing 4 when the torque is being applied to the fasteners 12, the torque applied by tightening the fasteners is more effective and the fasteners 12 are less likely to come loose over time. Thus, employing the seal plate 5 also enhances the valve's ability to maintain the torque applied to the fasteners 12.

It is noted that the fasteners 12 are included in both of the cross-sectional diagrams depicted in FIGS. 2 and 3 merely for the purpose of enhancing understanding of how certain embodiments of the present invention may be assembled and held together, even though it should be apparent to those skilled in the art that the fasteners probably would not be located in the particular planes selected for the cross sectional views. Indeed, it should be apparent that neither the location, nor the type of fasteners used is critical to the scope of the claimed invention. Non-limiting examples of fasteners which can be employed in conjunction with the present invention may include, for example, screws, nuts, bolts, studs, clamps, hooks, pins, nails, latches, nuts or welds. Adhesives, such as glue, epoxy or cement, may also be employed to join, fasten and secure the components in certain embodiments of the present invention.

Figure 4A:
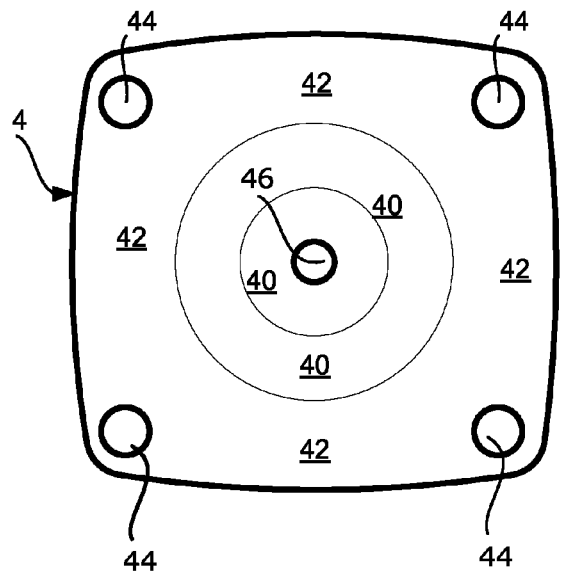
FIGS. 4A, 4B and 4C show, respectively, a top orthogonal view, a front orthogonal view and a front perspective view (from above) of an exemplary backing that may be used with some embodiments of the present invention.
Figure 4B:
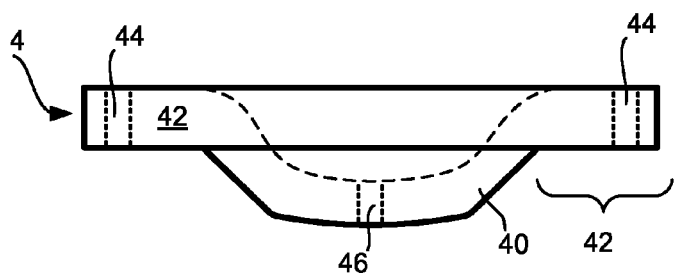
Figure 4C:
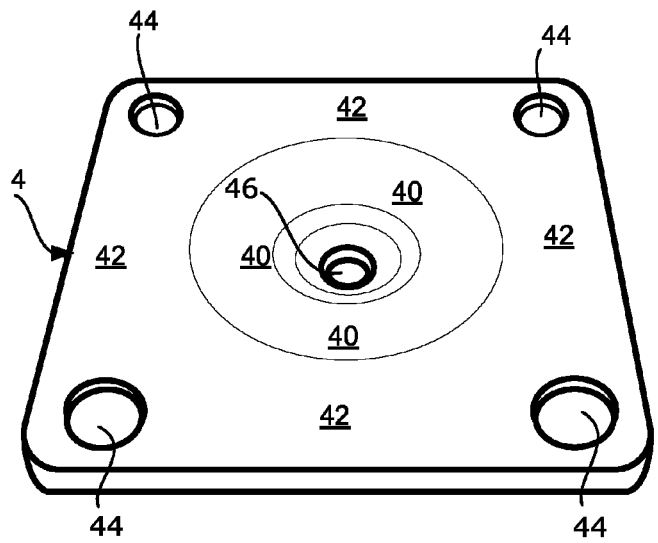

FIGS. 4A, 4B and 4C show, respectively, a top orthogonal view, a front orthogonal view and a front perspective view (from above) of the backing 4 that may be used with some embodiments of the present invention. The backing 4 is typically constructed from a spring-like elastomer, such as ethylene-propylenediene (EPDM), and thus is sometimes referred to in practice as a backing "cushion." As shown in FIGS. 4A, 4B and 4C, the backing 4 comprises a flexible central backing region 40 surrounded by a peripheral backing region 42. The central backing region 40 typically flexes above and below the peripheral backing region 42 in proportion to the travel of the compressor 20 (not shown). The central backing region 40 also includes at its center a hole 46 adapted to permit a mechanical link, such as mechanical link 22 (described above with reference to FIGS. 2 and 3) to pass therethrough. As shown in FIGS. 2 and 3, one end of the mechanical link 22 is connected to the compressor 20, the other end of the mechanical link 22 is connected to the shield 6, and the middle section of mechanical link 22 passes through the hole 46.

The peripheral backing region 42 of backing 4 comprises a substantially flattened area extending entirely around the perimeter of the backing 4, which is adapted to fit firmly and snugly between flanges on the bonnet assembly 2 and the closed path 52 of the seal plate 5, as shown in FIGS. 2 and 3 and described in more detail below with reference to FIGS. 5 and 7. The peripheral backing region 42 of backing 4 also includes a plurality of holes 44 adapted to permit fasteners (such as bolts, screws or pins) to pass therethrough, and thereby fix the peripheral backing region 42 of backing 4 securely to the bonnet assembly 2, the seal plate 5, the shield 6 and the valve body 8 (see FIG. 2) without impeding the travel or reach of the flexible central backing region 40.

The number, type and location of the fasteners in the device are not critical aspects of the present invention. Therefore, the precise number and location of the plurality of holes 44, if any, in backing 4 is also not a critical factor. Moreover, although the backing 4 is shown in the figures to comprise a substantially rectangular structure, having a substantially circular central backing region 40, it is to be understood that the overall geometry of the backing 4, as well as the shape of the central backing region 40, may be derived or formed from any shape deemed suitable for use with the particular size, shape and geometry of the components of the diaphragm valve or processing application in question. Suitable materials for construction of the backing 4 include, for example, any elastomer, including without limitation, rubber, ethylene-propylene co-polymers such as, ethylene-propylenediene (EDPM) and ethylene-propylene (EPM) and hexafluoropropylene-vinylidene fluoride co-polymers such as VITON®.

Although not depicted in the figures, it should be noted that corresponding holes for fasteners are located in the bonnet assembly 2 and the valve body 8. When the various components of the valve are assembled, these holes align and allow for insertion of four bolts, screws, pins, hooks or clamps to tighten down the components of the valve and to insure sufficient valve sealing to stop leakage of the process fluid into the environment. In other embodiments, the size and configuration of the holes are adapted to size and shape requirements of the particular fastener and valve size employed.

Figure 5A:
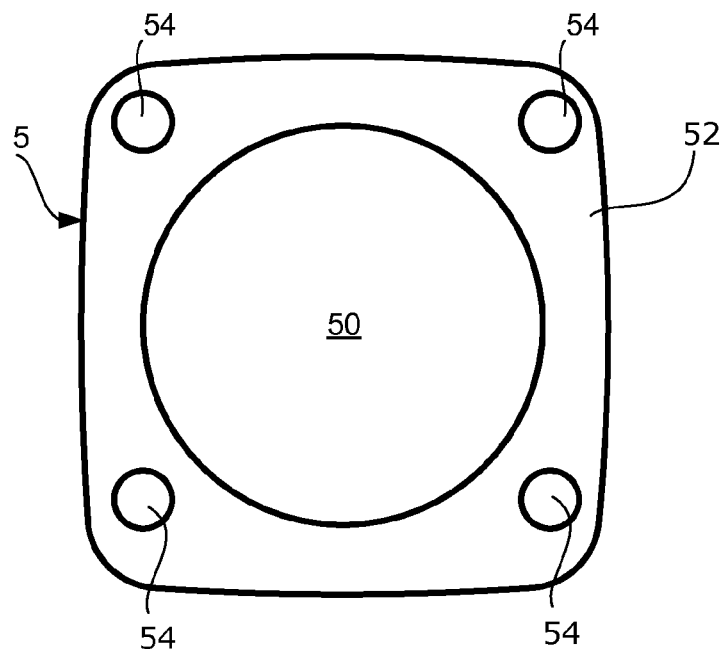
FIGS. 5A, 5B and 5C show, respectively, a top orthogonal view, a front orthogonal view, and front perspective view (from above), of an exemplary seal plate that may be used in one embodiment of the present invention.
Figure 5B:
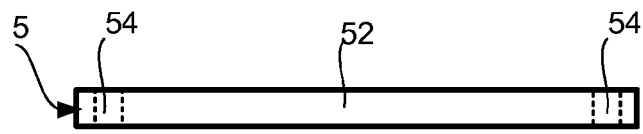
Figure 5C:
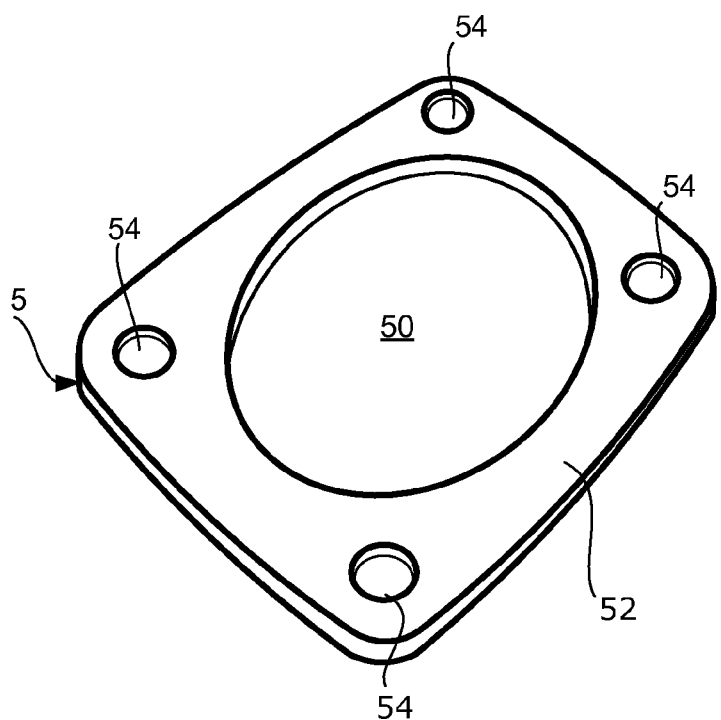

FIGS. 5A, 5B and 5C show, respectively, a top orthogonal view, a front orthogonal view, and front perspective view (from above), of the seal plate 5 that may be used with certain embodiments of the present invention. As shown best in FIG. 5A, the seal plate 5 typically comprises an aperture 50 circumscribed by a closed path 52. Typically, although not necessarily, the seal plate 5 also comprises a plurality of holes 54 configured to permit fasteners (such as fasteners 12) to pass therethrough. As with the backing 4, the number, type and location of the plurality of holes 54 to accommodate fasteners, if any, is also not critical. Moreover, although the closed path 52 of seal plate 5 is shown in the figures to comprise a substantially rectangular structure circumscribing a substantially circular aperture 50, it is to be understood that closed path 52 and the aperture 50 may be formed from any other three-dimensional geometric shape deemed most appropriate for use with the geometry of the particular valve or processing application, including without limitation closed paths and apertures that are formed from any other polygon or ellipsoid.

The seal plate 5 may be constructed from various rigid materials such as stainless steel, including for example, 304L, 306L, 316L, and AL6XN (24% nickel and 6.3% molybdenum content), and metals such as Hastelloy C-22 (alloy of nickel chromium and molybdenum) and titanium. In some instances, fiber reinforced polymer composite may be used, as long as the material is compatible with the process components and conditions and is more rigid than the material used for the backing 4. Preferably, but not necessarily, the seal plate 5 is made from a material that is also more rigid than the material used to construct the shield 6.

The thickness of the closed path 52 and the diameter of the aperture 50 circumscribed by the closed path 52 may be varied according to the particular shape and the requirements of the other components in the diaphragm valve in which it will be used, so long as the thickness is not so great or the diameter is not so small that they will interfere with or impeded the travel or reach of the central backing region 40 of the backing 4 or the central shield region 60 of the shield 6 during normal operation of the valve. The seal plate thickness is selected to insure that proper valve operation and closure is maintained while still having sufficient rigidity to provide adequate backing support to the raised peripheral seal bead 32 in the peripheral shield area 62 of the shield 6. As will be described in more detail below, the thickness of the closed path 52 of the seal plate 5 may also be varied to accommodate one or more access ports (or channels) extending from the aperture 50 to an outward-facing surface of the closed path 52.

Figure 6A:
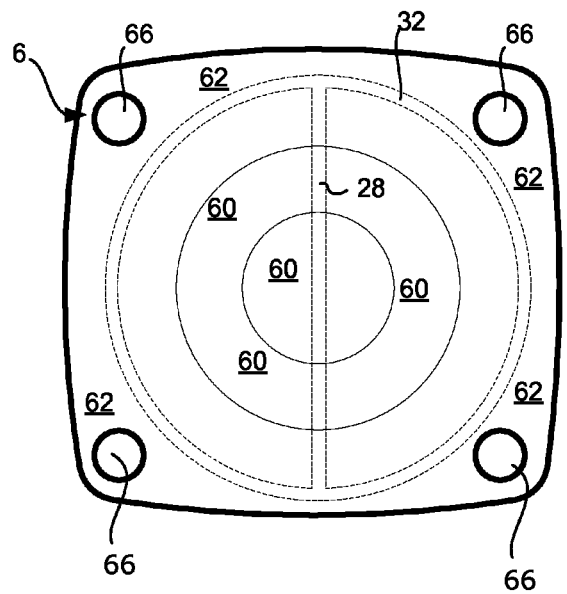
FIGS. 6A, 6B and 6C show, respectively, a top orthogonal view, a front orthogonal view and a front perspective view (from above) of an exemplary shield with a raised peripheral seal bead and a raised transverse seal bead, which may be used with some embodiments of the present invention.
Figure 6B:
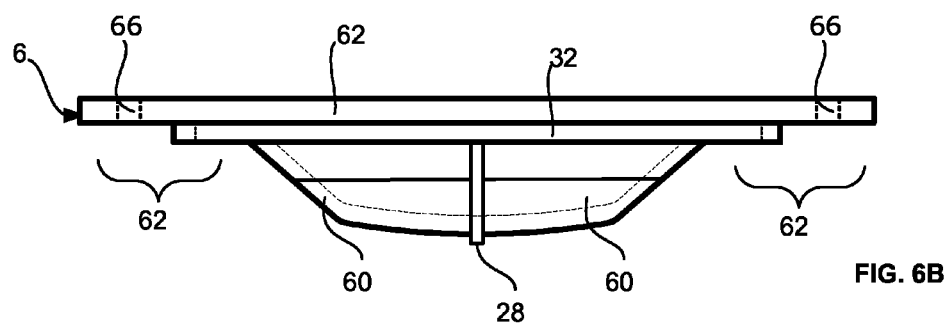
Figure 6C:
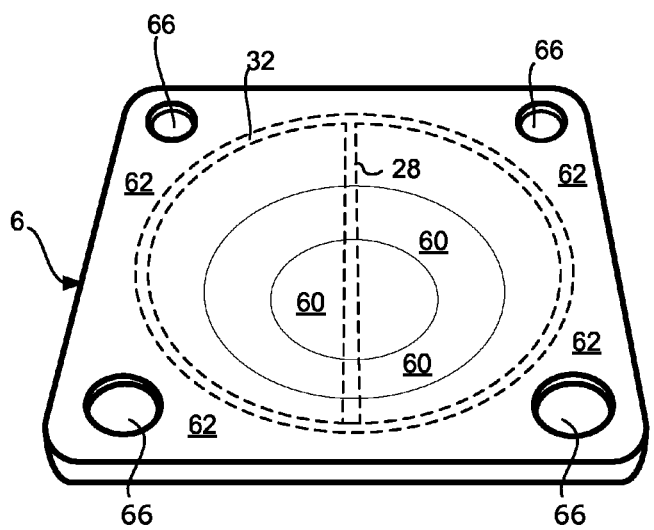

FIGS. 6A, 6B and 6C show, respectively, a top orthogonal view, a front orthogonal view and a front perspective view (from above) of the shield 6, which may be used with some embodiments of the present invention. As illustrated, shield 6 comprises a central shield region 60 surrounded by a peripheral shield region 62. The central shield region 60 is configured to flex above and below the peripheral shield region 62 in proportion to the travel of the compressor 20 (the compressor 20 is not shown in FIGS. 6A-6C) connected to the central shield region 60 by, for example, a mechanical link 22 (also not shown in FIGS. 6A-6C) passing through the hole 46 in the central backing region 40 of the backing 4. The peripheral shield region 62 of the shield 6 comprises a substantially flattened region extending entirely around the perimeter of shield 6, which is adapted to fit firmly and snugly between the closed path 52 of the seal plate 5 and flanges on the valve body 8. The peripheral shield region 62 of the shield 6 also includes a plurality of holes 66 adapted to permit fasteners (such as bolts, screws or pins) to pass therethrough, and thereby fix the peripheral shield region 62 of shield 6 securely to the bonnet assembly 2, the backing 5, the closed path 52 of the seal plate 5 and the valve body 8 (see FIG. 2) without impeding the travel or reach of the flexible central shield region 60 on the shield.

The perimeter shield region 62 of shield 6 further comprises a raised perimeter seal bead 32, which runs continuously around the entire perimeter shield region 62, as well as a transverse seal bead 28, which runs across the center of the central shield region 60 of shield 6. As previously stated, the perimeter seal bead 32 is configured to be compressed against the valve body 8 when the fasteners are in place to help prevent process fluid from leaking out of the internal flow pathway 18 and into the external environment by passing through small spaces between the shield 6 and the valve body 8. The transverse seal bead 28 on shield 6 is configured to meet and compress against the weir 10 in the internal flow pathway 18 of valve body 8 in order to form a tight seal that prevents process fluid F from passing out of the exit port 16 of the valve body 8 when the diaphragm valve is in the closed position (See FIGS. 2 and 3).

Suitable material for construction of the shield 6 include without libation: natural rubber, neoprene (2-chloro-1,3-butadiene), HYPALON® (clorosulfonated polyethylene), EPDM (ethylene-propylenediene), EPM (ethylene-propylene), silicone, TEFLON® (polytetrafluroethylene), and butyl rubber. An especially useful material combination for the flexible shield 6 and the backing 4 is TEFLON® and EDPM, respectively.

Figure 7A:
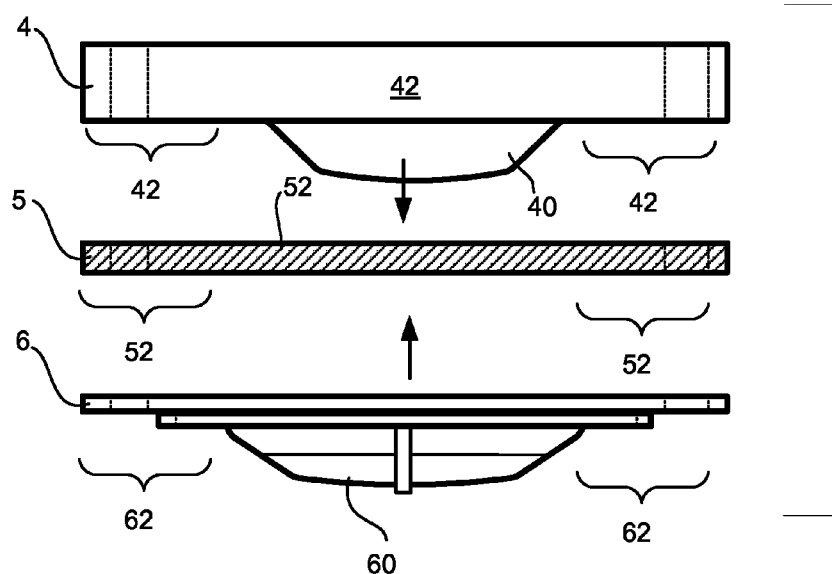
FIGS. 7A, 7B and 7C illustrate the exemplary seal plate being combined with (i.e., sandwiched between) the exemplary backing and exemplary shield.
Figure 7B:
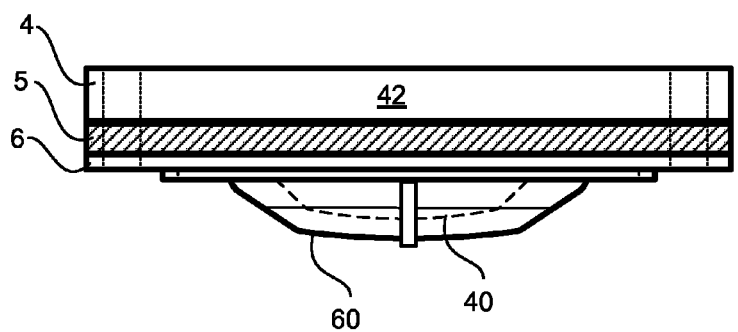
Figure 7C:
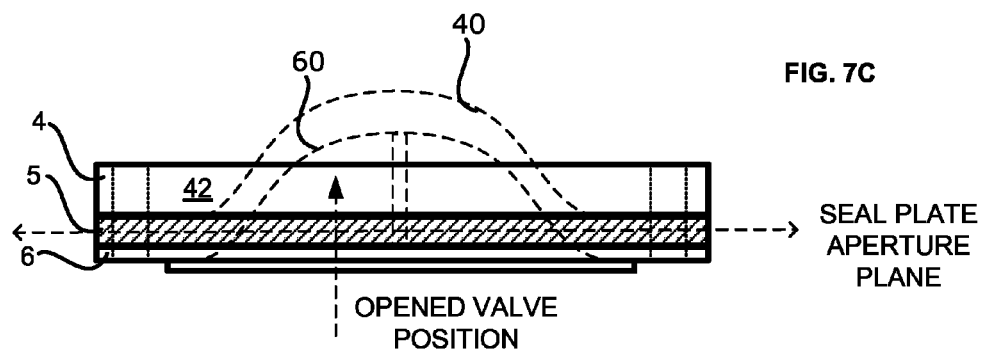

The diagrams of FIGS. 7A, 7B and 7C illustrate how the exemplary seal plate 5 is combined with (i.e., sandwiched between) the backing 4 and shield 6 to form a three-piece diaphragm according to embodiments of the present invention. As shown in FIGS. 7A and 7B, the backing 4, seal plate 5 and shield 6 are positioned adjacent to each other so that the closed path 52 of the seal plate 5 is sandwiched between the peripheral backing region 42 of backing 4 and the peripheral shield region 62 of the shield 6, and so that the central backing region 40 of backing 4 passes through the plane of aperture 50 of seal plate 5 to rest in the concavity formed by the top of the central shield region 60 in the shield 6. Once the three-piece diaphragm is so assembled, it may be secured between the bonnet assembly 2 and the valve body 8 with fasteners (such as fasteners 12) as shown, for example, in FIGS. 2 and 3, or by an adhesive, such as, for instance, glue or cement. When the handle 26 and stem 24 are operated to withdraw the compressor 20 to open the valve, the central backing region 40 of the backing 4 and the central shield region 60 of the shield 6 are both pulled by the compressor 20 back up and through the plane of the aperture 50, as indicated by the dotted lines and arrows in FIG. 7C, to permit more process fluid F to flow through the internal flow pathway 18 (not shown in FIG. 7C).

Figure 8A:
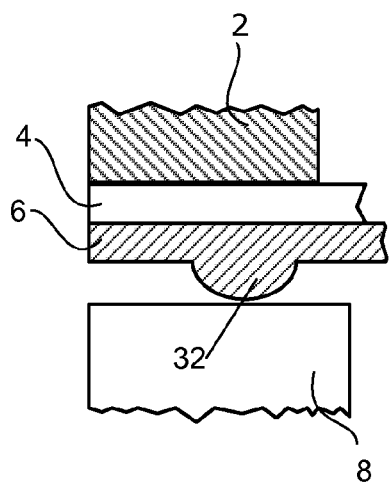
Figure 8B:
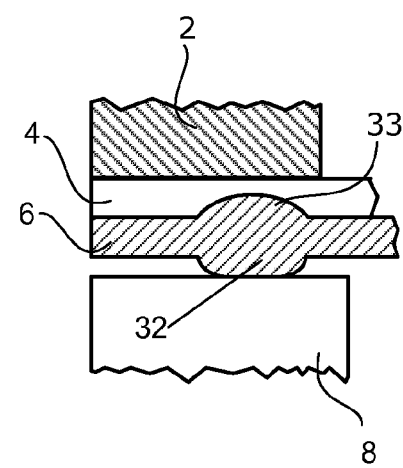
Figure 8C:
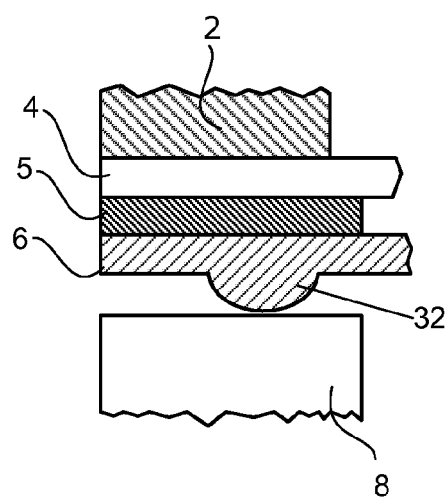
FIGS. 8C and 8D show detailed cross-sectional views of some of the components of a three-piece diaphragm valve (untorqued and torqued), constructed according to certain embodiments of the present invention.
Figure 8D:
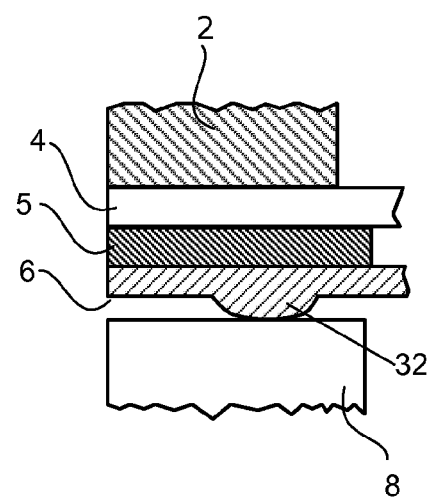

FIGS. 8A and 8B show detailed cross-sectional views of some of the components of a conventional two-piece diaphragm valve (untorqued and torqued), while FIGS. 8C and 8D show detailed cross-sectional views of some of the components of a three-piece diaphragm valve (untorqued and torqued) constructed according to certain embodiments of the present invention. Beginning with FIG. 8A, it can be seen that, in the untorqued (i.e., unstressed) situation, the raised perimeter seal bead 32 on the shield 6 is positioned between the bonnet assembly 2, the backing 4 and the valve body 8. The purpose of this arrangement is to have the raised perimeter seal bead 32 form an adequate seal between the shield 6 and the valve body 8 to prevent fluid from leaking to the external environment. As shown in FIG. 8B, however, as torque is applied by tightening the fasteners, the raised perimeter seal bead 32 begins to lose its integrity and force a portion 33 of the shield to back flow into the backing 4, which undermines the seal between the shield 6 and the valve body 8, and permits fluid to leak into the external environment. This leakage will, in all likelihood, prompt the valve operator to apply even more torque to the fasteners on the valve, if possible, which only forces more of the raised perimeter seal bead 32 of the shield 6 to back flow into the backing 4, which then leads to even more back flowing of portion 33, and more external leakage.

Back flowing of portions 33 of the shield 6 does not always occur immediately. As torque is applied by the tightening of the fasteners, the raised perimeter seal bead 32 may be stressed to the point that the material used to construct shield 6 begins to cold-flow over time. This phenomenon is called "cold flow." Cold-flow is particularly prevalent when PTFE (polytetrafluoroethylene) shields are used.

The diagrams in FIGS. 8C and 8D illustrate one of the benefits of the present invention. As shown in FIG. 8C, a seal plate 5 having a rigidity greater than the rigidities of backing 4 and shield 6 is interposed between the backing 4 and the shield 6 before they are secured between bonnet assembly 2 and valve body 8 with fasteners. With seal plate 5 in place, and as shown best in FIG. 8D, no part of the raised perimeter seal bead 32, nor any portion of the shield 6 that lies adjacent to, above or underneath the raised perimeter seal bead 32, can be forced into the backing 4 by increasing the torque and/or compression forces exerted against shield 6. Therefore, the raised perimeter seal bead 32 better maintains its integrity because the relatively rigid seal plate 5 prevents back-flow of the raised perimeter seal bead 6 into the backing 4. Thus, due to the introduction of the rigid seal plate 5, the back-flow problem has been eliminated and the seal plate 5 has enabled a wider, better seal between the shield 6 and the valve body 8. Notably, embodiments and variation of the present invention can prevent cold flow of the perimeter shield region into the backing even when there is no raised perimeter seal bead.

Figure 9A:
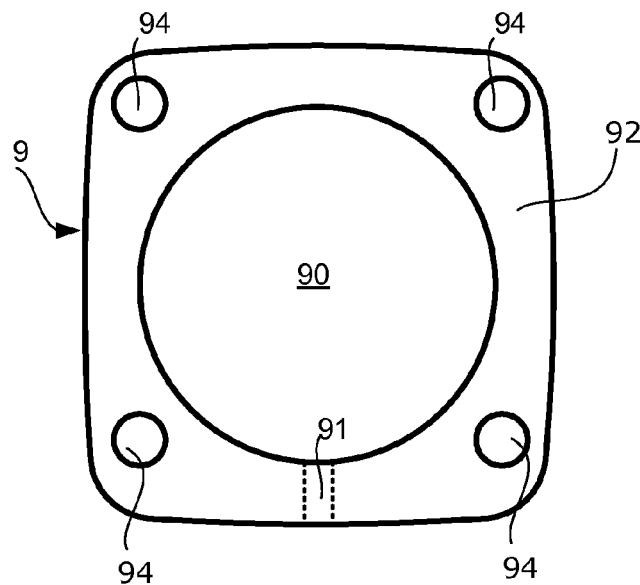
FIGS. 9A, 9B and 9C show, respectively, a top orthogonal view, a front orthogonal view, and front perspective view (from above), of another exemplary seal plate that may be used in one embodiment of the present invention, wherein the seal plate includes an access port passing through the closed path of the seal plate, as well as a port connector.
Figure 9B:
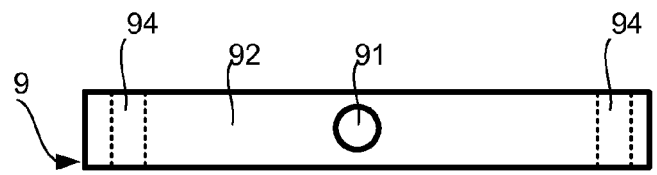
Figure 9C:
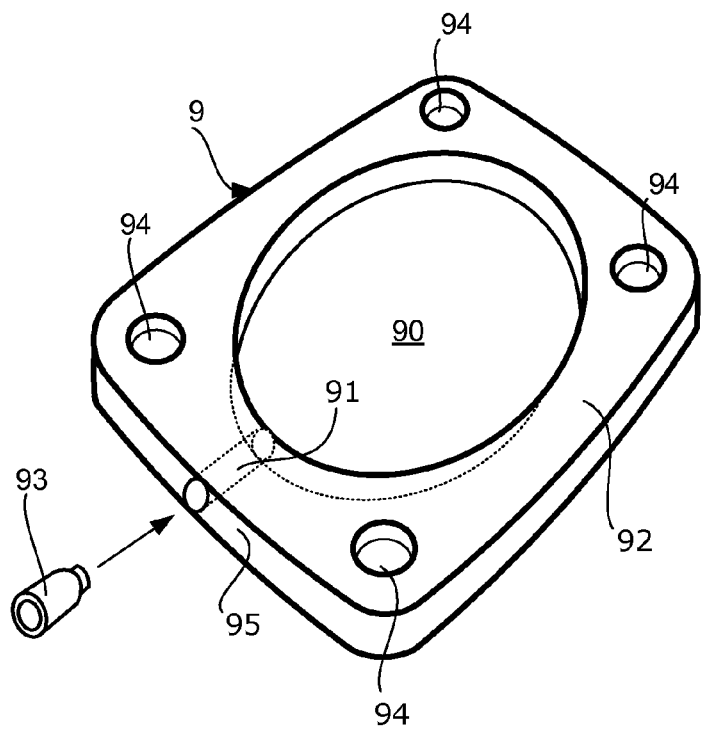

Certain embodiments of the present invention also provide a diaphragm valve with leak detection capability, which capability does not require disassembling the valve to physically inspect the shield and backing for rips, ruptures, punctures or tears, or other physical integrity problems that could cause internal leaks. To achieve this capability, an access port is machine-drilled through the closed path of the seal plate to provide a channel, referred to herein as an access port, by which certain properties (such as the pressure, volume or moisture level) of fluid existing in the void between the shield 6 and the backing 4 may be detected and measured. A substantial deviation in the properties of the fluid in the void typically indicates a failure in the shield 6 and, potentially, contamination of the process fluid or the surrounding environment. FIGS. 9A, 9B and 9C show, respectively, a top orthogonal view, a front orthogonal view, and front perspective view (from above) of one embodiment of such a seal plate.

As shown in FIGS. 9A-9C, seal plate 9, like seal plate 5 in FIGS. 5A-5C, comprises an aperture 90 circumscribed by a closed path 92, as well as a plurality of holes 94 configured to permit fasteners (such as fasteners 12 in FIGS. 2 and 3) to pass therethrough. Unlike seal plate 5, however, seal plate 9 further comprises an access port 91 that extends through the closed path 92, thereby providing a channel that connects aperture 90 to a port connector 93 located on an outward-facing surface 95 of closed path 92. As will be described in more detail below, access port 91 is configured to fluidly connect the port connector 93 to the interstitial void existing between the shield 6 and the backing 4 of the diaphragm. Although the port connector 93 is shown in FIG. 9C to comprise a separate, detachable component, it should be understood that, in some embodiments of the present invention, the port connector may comprise an entirely different structure or arrangement, including without limitation, a threaded or non-threaded hole, bib or jack, which may or may not protrude from the outward-facing surface 95 of the closed path 92, and which may or may not be permanently attached to the outwardly-facing surface 95. In preferred embodiments, however, the port connector 95 comprises a standardized connector embodied within or attached to the closed path 92, which permits an interface (not shown) to a breach detector, such as a pressure sensor, to be quickly and easily attached, connected or inserted (i.e., "snapped" into place). Even more preferable, the port connector 93 is configured to remain closed and sealed while the interface to the breach detector is not attached or in use, and automatically open upon attachment or use of the interface to the breach detector. Nonlimiting examples of suitable port connectors include, for instance, Swagelok® (QC series, QM Series and QTM Series) Quick Connects. (www.swagelok.com).

Figure 10:
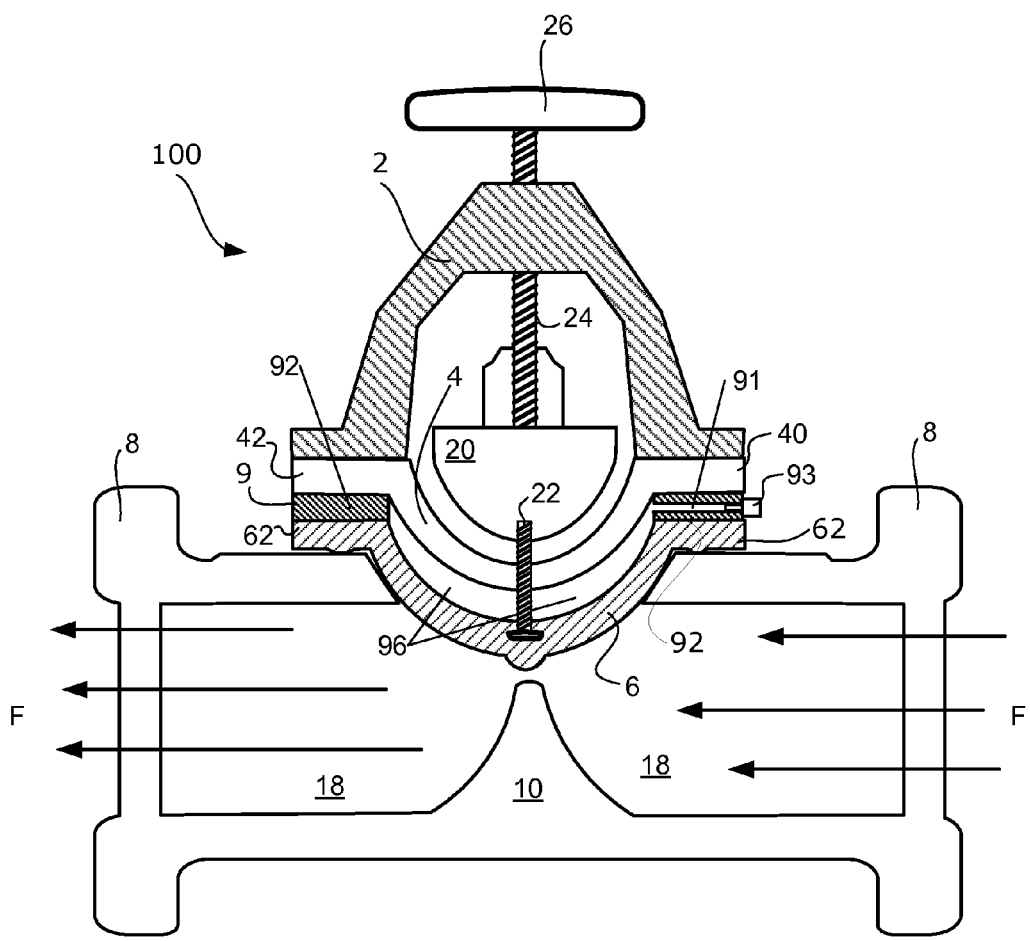
FIG. 10 shows a cross-sectioned view of a diaphragm valve according to an embodiment of the present invention, illustrating the access port, interstitial void and port connector for attaching a breach detector.

FIG. 10 shows a cross-sectioned view that illustrates by way of example a diaphragm valve with leak detection capability according to one embodiment of the present invention. As shown in FIG. 10, the diaphragm valve 100 comprises a bonnet assembly 2, a valve body 8, a shield 6 having a peripheral shield region 30, a backing 4 having a peripheral backing region 40, a seal plate 9 having an aperture 90 circumscribed by a closed path 92, and one or more fasteners (not shown in FIG. 10) for securing the shield 6, the backing 4 and the seal plate 9 between the bonnet assembly 2 and the valve body 8. The closed path 92 of the seal plate 9 lies between the peripheral shield region 62 of the shield 6 and the peripheral backing area 42 of the backing 4. A substantially enclosed interstitial void 96, located between and bounded by the backing 4, the closed path 92 and the shield 6, confines a volume of fluid (for ease of comprehension, the confined fluid is not shown in FIG. 10). An access port 91 extends though the closed path 92 of the seal plate 9 to fluidly couple the substantially enclosed interstitial void 96 to the port connector 93 located on an outward-facing surface of the closed path 92.

In this embodiment, the port connector 93 is configured to provide an interface to an optional breach detector (not shown in FIG. 10) that can be attached to detect deviations in one or more properties associated with the fluid confined by the substantially enclosed interstitial void 96, such as pressure, volume, moisture or mass deviations. Notably, the position of the closed path 92 interposed between the perimeter backing region 42 and the perimeter seal region 62 prevents the peripheral shield area 62 (and any perimeter seal bead thereon) from back flowing into the perimeter backing region 42.

Figure 11:
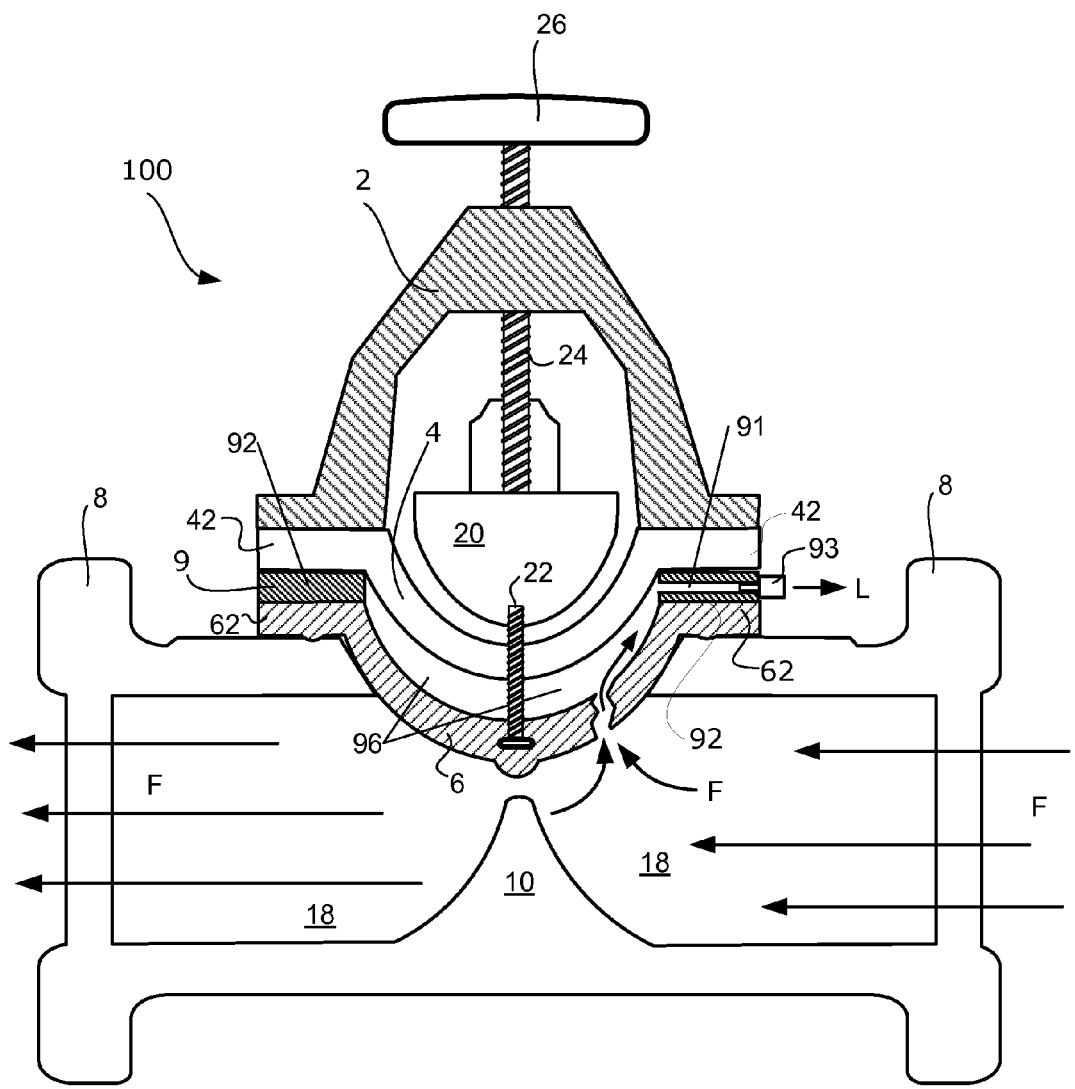
FIG. 11 shows another cross-sectional view of the diaphragm valve of FIG. 10, but with a ruptured shield and process fluid passing into and through the rupture, interstitial void, access port and port connector.

FIG. 11 shows another cross-sectional view of the diaphragm valve 100 of FIG. 10. In FIG. 11, however, it can be seen that there is a rupture in shield 6, which permits process fluid F to pass into and through the rupture and infiltrate the substantially enclosed interstitial void 96 bounded by the perimeter backing region 42 of the backing 4, the perimeter shield region 62 of the shield 6 and the closed path 92 of the seal plate 9. Since the substantially enclosed interstitial void 96 is fluidly connected to the port connector 93 via the access port 91, the process fluid F passing into the substantially enclosed interstitial void 96 will pass out of the diaphragm valve 100 via the port connector 93, and/or force at least some of the volume of fluid that was confined in the interstitial void 96 before the rupture occurred to pass out of the diaphragm valve 100 via the access port 91 and port connector 93. In either case, process fluid F entering the substantially enclosed interstitial void 96 will result in a pressure and volume deviation in the interstitial void 96. If a breach detector (not shown in FIG. 11) comprising, for example, a pressure sensor, pressure switch, pressure transmitter or volumetric flow sensor, is attached to the port connector 93 and properly calibrated to detect this pressure or volume deviation, a signal will be sent to a human operator, an alarming device or a data communications network indicating that a breach has occurred. Pressure sensors suitable for use as breach detectors in embodiments of the present invention include, for instance, the Rosemount 3051C, available from the Rosemount Measurement Division of Emerson Process Management (www.emersonprocess.com), located in Chanhassen, Minn., USA.

Figure 12A:
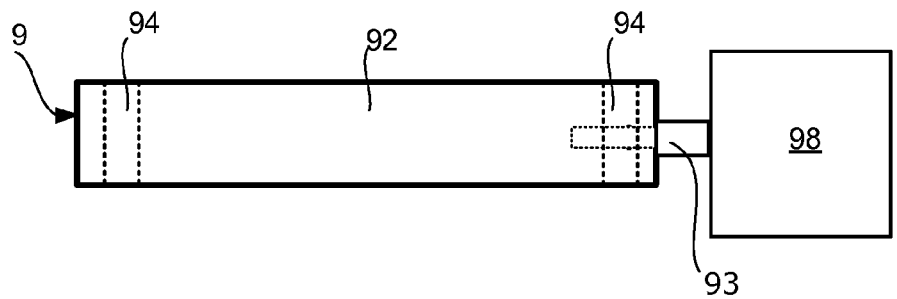
FIGS. 12A and 12B show diagrams of an electronic breach detector that could be used with certain embodiments of the present invention.
Figure 12B:
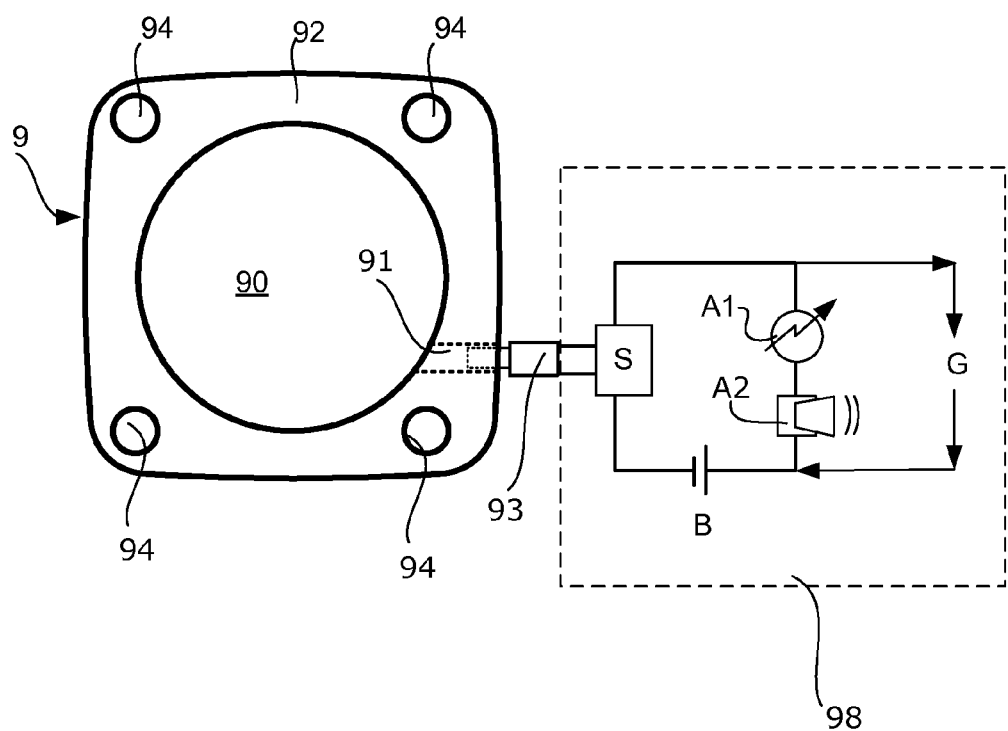

FIGS. 12A and 12B show diagrams of a seal plate 9 and an electronic breach detector 98 that could be attached to the seal plate 9 according to certain embodiments of the present invention. As shown in FIG. 12A, the electronic breach detector 98 is attached to the port connector 93 located on the outwardly-facing surface of the closed path 92 of the seal plate 9. As best illustrated in FIG. 12B, the closed path 92 of seal plate 9 circumscribes an aperture 90. When the backing 4, seal plate 9 and shield 6 are assembled (as shown in FIGS. 7A and 7B), and fixed between the bonnet assembly and valve body (as shown in FIGS. 10 and 11), the central regions of the backing 4 and shield 6 are positioned to flex back and forth through the plane of the aperture 90 as the valve is alternately opened and closed (see the illustration in FIG. 7C). The closed path 92 also comprises a plurality of holes 94 to accommodate the fasteners. The closed path 92 further comprises an access port 91, extending from the aperture 90 to the port connector 93, which fluidly couples the void located between the backing 4 and the shield 6 to the breach detector 98.

FIG. 12B provides more detail for an exemplary electronic breach detector 98 connected to port connector 93 on the closed path 92 of the seal plate 9. As shown in FIG. 12B, electronic breach detector 98 typically comprises a switch S that is activated by either a negative or a positive deviation in pressure in the substantially enclosed space defined by the access port 91, the closed path 92 of the seal plate 9, the backing 4 and the shield 6. The switch S is electronically coupled to a visual alarm A1, such as a flashing light, and/or an audible alarm A2, such as a siren, both configured to activate when a pressure deviation has been detected. A power source B, such as a battery, may be encompassed by the detector 98, as shown in FIG. 12B, or the power source may reside at a location outside of the detector. A signal loop or signaling device G communicates with an external control system, such as a data communications network or control panel (not shown).

When a breach or rupture of the shield 6 or the backing 4 occurs, the change in pressure in the interstitial void causes the pressure switch S to close the circuit, which activates local alarms A1 and A2 powered by power source B. If the external signal loop or signaling device G is enabled, a signal indicating the breach has occurred is communicated to the external control system or panel for distribution to a process supervisor, operator or maintenance technician.

Notably, the access port 91 may be placed at any location or angle in the closed path 92 that will permit the access port 91 to intersect both the outward-facing surface on the closed path 92 and the aperture 90. Thus, there is no requirement that the access port 91 be located on or parallel to a line that passes through the center of the aperture 90, if such a center exists. Moreover, there is also no requirement that the access port comprise a substantially linear structure through the closed path 92. In other words, the conduit or channel serving as the access port may turn, spiral, angle or curve around or through the closed path 92. It is also anticipated that, in certain situations, it may be necessary or desirable to utilize multiple access ports and/or multiple port connectors in the same valve. Such alternative configurations for the access port and/or closed path are not considered outside the scope of the claimed invention.

Figure 13:
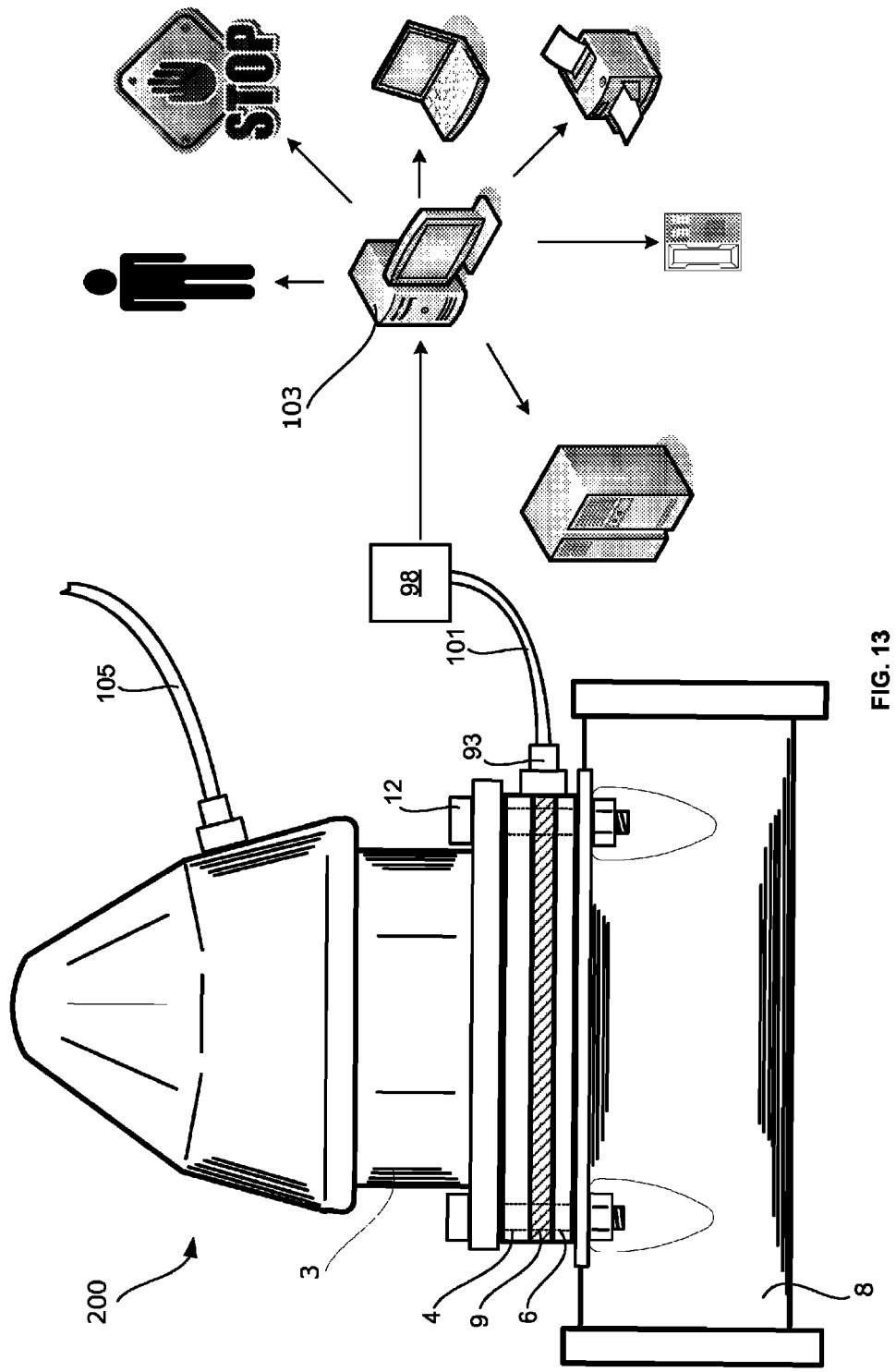
FIG. 13 shows an embodiment of the present invention having an automatic actuator, a pneumatic tube connected to the automatic actuator, a breach detector connected to the port connector on the seal plate, and an exemplary computer network attached to the breach detector.

In the diagrams and figures discussed above, embodiments of the invention are shown and described as using a manual mechanism (i.e., a stem assembly 24 coupled to a turn handle 26) to actuate the compressor to open and close the valve. It should be noted, however, that embodiments of the present invention may be beneficially used and applied in diaphragm valves wherein the compressor is actuated by automatic means, such as by pneumatic or hydraulic actuators. FIG. 13 shows pneumatically-actuated diaphragm valve 200 constructed according to yet another embodiment of the present invention. As shown in FIG. 13, pneumatically-actuated diaphragm valve 200 comprises a backing 4, a seal plate 9 and a shield 6, all of which are fixed between a bonnet assembly 3 and valve body 8 with fasteners 12. The bonnet assembly 3 is coupled to pneumatic tube 105 that provides air pressure to the actuator inside the bonnet assembly 3.

Seal plate 9, which is more rigid than backing 4, and preferably more rigid than the shield 6 as well, lies between the backing 4 and the shield 6 in order to prevent any portion of the shield 6 from back flowing into the backing 4 as a result of torquing (or over-torquing) the fasteners 12. Although not visible in FIG. 13, a substantially enclosed interstitial void, which lies between the backing 4 and the shield 6, is fluidly coupled to port connector 93 located on the outward-facing surface of the seal plate 9 by an access port (also not shown) extending through the seal plate 9 from the port connector 93 to the substantially enclosed interstitial void.

A detector 98 (described in more detail above with reference to FIG. 12B) is attached to the port connector 93 via an interface cord 101. The detector 98 is then coupled, according to methods well known in the art, to a computer system 103 in a data communications network, as shown, to enable distribution of signals and alerts generated by the detector 98 to human operators and other devices connected to the data communications network, such as servers, control panels, laptops, handheld computers, printers and telephone systems.

Selection of materials of construction for the various parts of the diaphragm valves according to the present invention may be based on their performance ratings with regard to the process conditions (chemical exposure, operating temperature, operating pressure) the parts are subjected to. Typical examples of materials of construction for the valve body and the bonnet assembly include but are not limited to stainless steels such as, 304L, 306L, 316L, and AL6XN (24% nickel and 6.3% molybdenum content), and metals such as Hastelloy C-22 (alloy of nickel chromium and molybdenum) and titanium.

Although the exemplary embodiments, uses and advantages of the invention have been disclosed above with a certain degree of particularity, it will be apparent to those skilled in the art upon consideration of this specification and practice of the invention as disclosed herein that alterations and modifications can be made without departing from the spirit or the scope of the invention, which are intended to be limited only by the following claims and equivalents thereof.

What is claimed is:

1. A diaphragm valve, comprising:
a bonnet assembly;
a valve body;
an internal flow pathway;
a compressor;
a two-piece flexible diaphragm comprising a flexible shield and a flexible backing,
the flexible shield having a peripheral shield region and a flexible central region, and
the flexible backing having a peripheral backing region and a flexible central backing region;
a seal plate comprising an aperture circumscribed by a closed path;
one or more fasteners for securing the flexible shield, the flexible backing and the seal plate between the bonnet assembly and the valve body so that the closed path of the seal plate lies between the peripheral shield region and the peripheral backing region;
wherein, the closed path of the seal plate prevents the peripheral shield region from flowing into the peripheral backing region despite compressive forces exerted on the peripheral shield region by operation of said one or more fasteners;
wherein, upon activation of the compressor to open or close the internal flow pathway, both the flexible central shield region of the flexible shield and the flexible central backing region of the flexible backing will flex above and below the plane of the aperture of the seal plate in proportion to the travel of the compressor;
a substantially enclosed interstitial void located between the flexible central shield region and the flexible central backing region;
a fluid located within the substantially enclosed interstitial void;
a port connector located on an outward-facing surface of the closed path of the seal plate; and
an access port passing through the closed path of the seal plate to fluidly couple the substantially enclosed interstitial void to said at least one port connector;
wherein said port connector is configured to provide an interface to a breach detector that will detect a deviation in a property associated with the fluid located within the substantially enclosed interstitial void; and wherein the access port does not pass through a wall of the flexible shield or the flexible backing.

2. The diaphragm valve of claim 1, wherein:
the property is the fluid's pressure; and
the breach detector comprises at least one of a pressure sensor, a pressure transducer or a pressure transmitter.

3. The diaphragm valve of claim 1, wherein:
the property is the fluid's volume; and
the breach detector comprises a volumetric flow sensor.

4. The diaphragm valve of claim 1, wherein:
the property is the fluid's moisture content;
and the breach detector is a moisture detector.

5. The diaphragm valve of claim 1, wherein the property is the fluid's mass.

6. The diaphragm valve of claim 1, further comprising the breach detector.

7. The diaphragm valve of claim 6, further comprising an alert system, coupled to the breach detector, configured to provide a visual or audible alert responsive to the detection of the pressure deviation by the pressure sensor.

8. The diaphragm valve of claim 6, further comprising a data communications network, coupled to the breach detector, configured to generate an alert responsive to the detection of the pressure deviation by the breach detector.

9. The diaphragm valve of claim 8, wherein the breach detector comprises at least one of a mechanical switch, a hydraulic switch, an electronic switch and a pneumatic switch.

10. The diaphragm valve of claim 1, wherein the closed path of the seal plate further comprises a plurality of access ports passing through the closed path to fluidly couple the substantially enclosed interstitial void to said port connector.

11. The diaphragm valve of claim 10, wherein:
said closed path of the seal plate further comprises a plurality of port connectors located on one or more outward-facing surfaces; and
the plurality of access ports are connected, respectively, to the plurality of port connectors.

12. A diaphragm valve, comprising:
a bonnet assembly;
a valve body;
an internal flow pathway;
a compressor;
a two-piece flexible diaphragm comprising a flexible shield and a flexible backing,
the flexible shield having a peripheral shield region and a flexible central region, and
the flexible backing having a peripheral backing region and a flexible central backing region;
a seal plate comprising an aperture circumscribed by a closed path;
one or more fasteners for securing the flexible shield, the flexible backing and the seal plate between the bonnet assembly and the valve body so that the closed path of the seal plate lies between the peripheral shield region and the peripheral backing region;
a substantially enclosed interstitial void located between the flexible central shield region and the flexible central backing region;
a port connector located on an outward-facing surface of the closed path of the seal plate; and
an access port, passing through the closed path of the seal plate, configured to fluidly couple the substantially enclosed interstitial void to said port connector;
wherein said port connector is configured to provide an interface to a breach detector that will detect a breach in the shield based on a deviation in a property associated with fluid located in the interstitial void;
wherein the access port does not pass through a wall of the shield or the backing; and
wherein, upon activation of the compressor to open or close the internal flow pathway, both the flexible central shield region of the flexible shield and the flexible central backing region of the flexible backing will flex above and below the plane of the aperture of the seal plate in proportion to the travel of the compressor.

13. The diaphragm valve of claim 12, wherein the breach detector will detect a pressure deviation in the substantially enclosed interstitial void.

14. The diaphragm valve of claim 12, wherein:
the substantially enclosed interstitial void confines a volume of fluid; and
the breach detector will detect a change in the volume of fluid confined by the substantially enclosed interstitial void.

15. The diaphragm valve of claim 12, wherein the closed path of the seal plate is configured to prevent the peripheral shield region from penetrating the peripheral backing region despite compressive forces exerted on the peripheral shield region by operation of said one or more fasteners.

16. The diaphragm valve of claim 15, wherein:
the peripheral shield region comprises a raised perimeter seal bead; and
the closed path of the seal plate is configured to prevent the raised perimeter seal bead from back-flowing into the perimeter backing region of the backing despite the compression forces exerted on the perimeter seal bead by operation of said one or more fasteners.

17. The diaphragm valve of claim 15, wherein the closed path of the seal plate has a rigidity that is greater than the rigidity of the perimeter backing region of the backing.

18. The diaphragm valve of claim 15, wherein the closed path of the seal plate has a rigidity that is greater than the rigidity of the peripheral shield region.

19. The diaphragm valve of claim 15, wherein the closed path of the seal plate has a rigidity that is greater than the rigidities of both the perimeter backing region of the backing and the peripheral shield region.

20. The diaphragm valve of claim 12, further comprising the breach detector.

21. The diaphragm valve of claim 20, further comprising an alert system, attached to the breach detector, configured to provide a visual or audible alert responsive to the detection of the breach by the breach detector.

22. The diaphragm valve of claim 20, further comprising a data communications network, coupled to the breach detector, configured to generate an alert responsive to the detection of the breach by the breach detector.

23. The diaphragm valve of claim 20, wherein the breach detector comprises at least one of a pressure sensor, a pressure transducer, a pressure transmitter, a volumetric flow sensor, a moisture detector, a mechanical switch, a hydraulic switch, an electronic switch and a pneumatic switch.

24. The diaphragm valve of claim 12, wherein the closed path of the seal plate further comprises a plurality of access ports passing through the closed path to fluidly couple the substantially enclosed interstitial void to said port connector.

25. The diaphragm valve of claim 24, wherein:
said closed path of the seal plate further comprises a plurality of port connectors located on one or more outward-facing surfaces; and
the plurality of access ports are connected, respectively, to the plurality of port connectors.

26. The diaphragm valve of claim 12, wherein the backing is constructed from an elastomer.

27. The diaphragm valve of claim 12, wherein the shield is constructed from a polymer.

28. The diaphragm valve of claim 12, wherein the shield is constructed from a material selected from the group consisting of: natural rubber, neoprene (2-chloro-1,3-butadiene), HYPALON® (clorosulfonated polyethylene), EPDM (ethylenepropylenediene), EPM (theylene-propylene), silicone, TEFLON® (polytetrafluoroethylene) and butyl rubber.

29. The diaphragm valve of claim 12, wherein the backing is constructed from a material selected from the group consisting of: rubber, ethylene-propylenediene (EPDM) and hexafluoropropylene-vinylidene fluoride.

30. The diaphragm valve of claim 12, wherein the backing is constructed from ethylene-propylenediene (EPDM) and the shield is constructed from polytetrafluoroethylene.

\* \* \* \* \*